July 6, 1937.　　　C. G. EKHOLM ET AL　　　2,086,492
MACHINE FOR WORKING ON CURVED SHAFTS OR THE LIKE
Filed Oct. 25, 1935　　　3 Sheets-Sheet 2
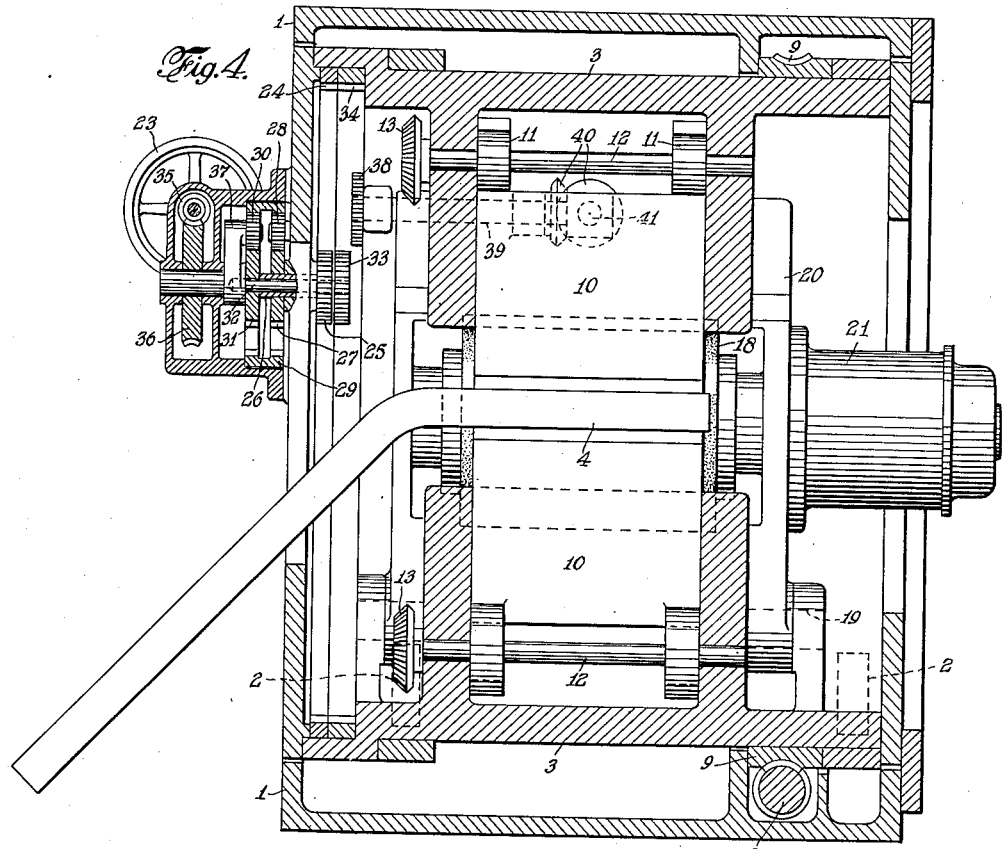
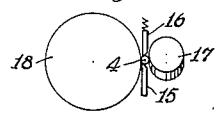
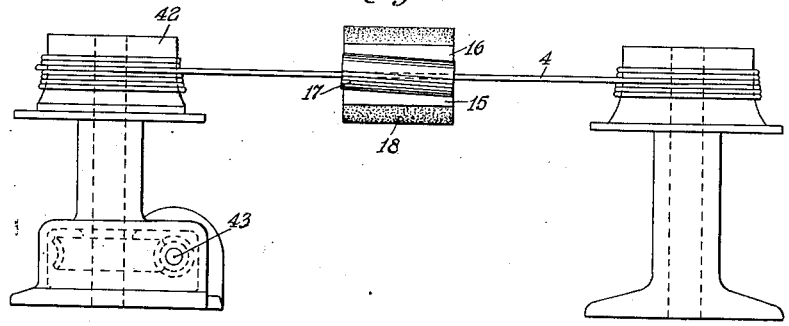
INVENTORS
CARL GUSTAF EKHOLM
KARL JOHN WILLIAM JANSON
BY *Chas. Lynn Russell*
　　THEIR　ATTORNEY.

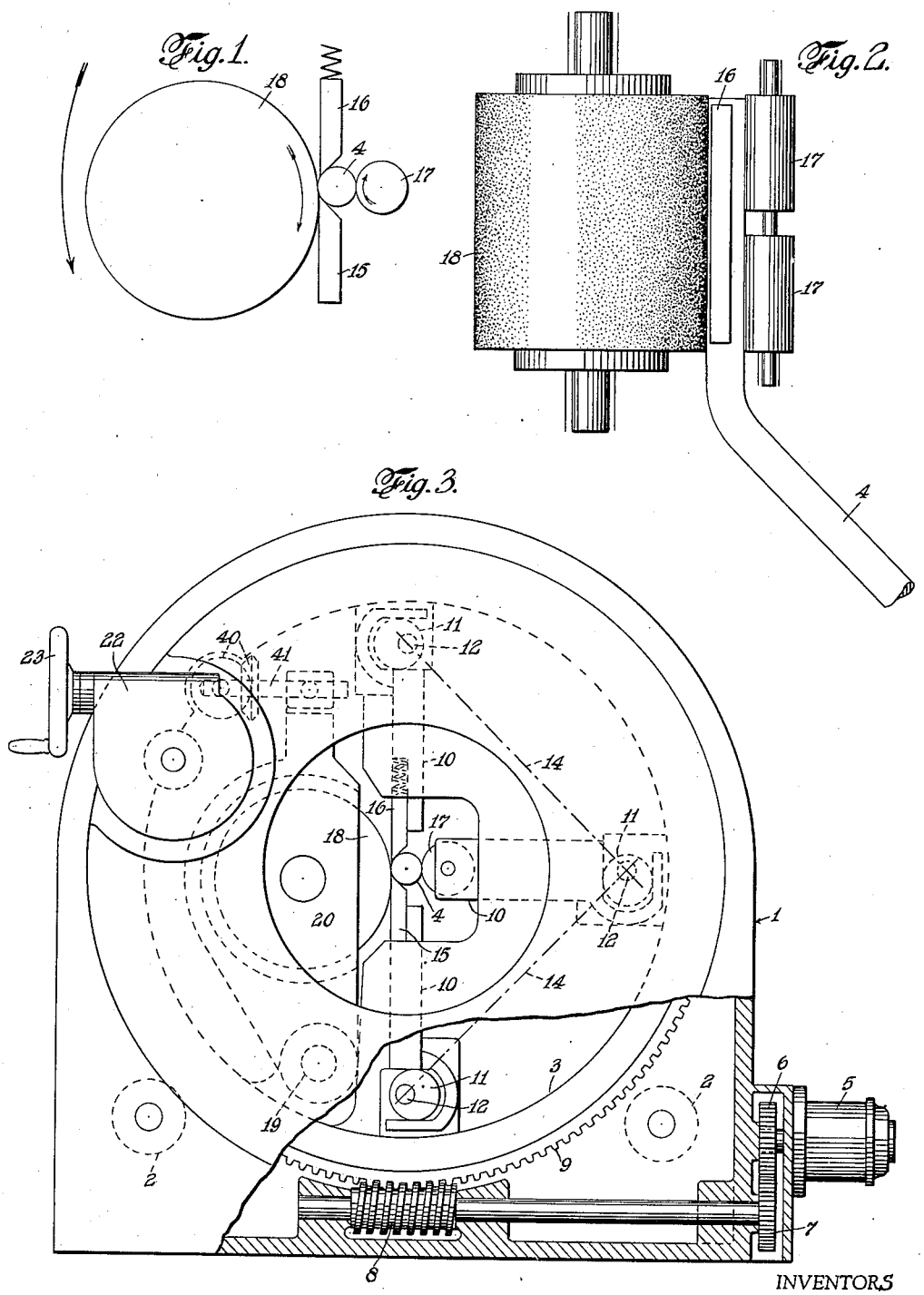

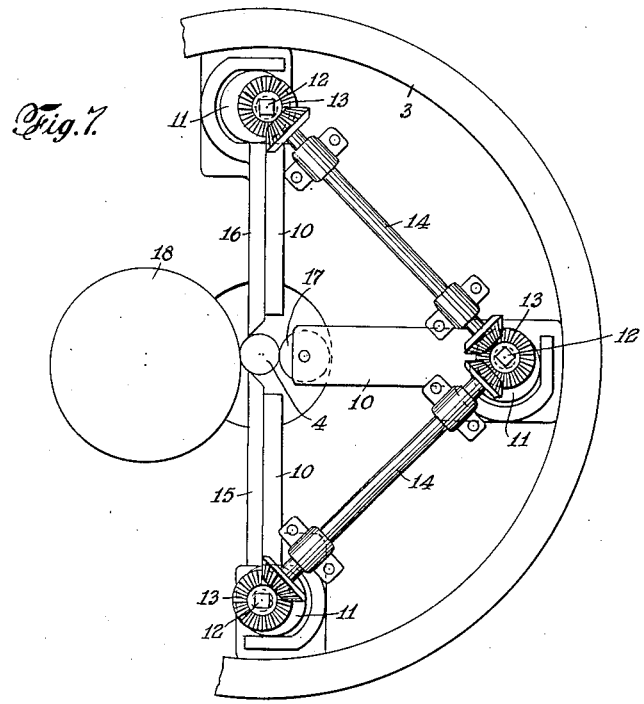
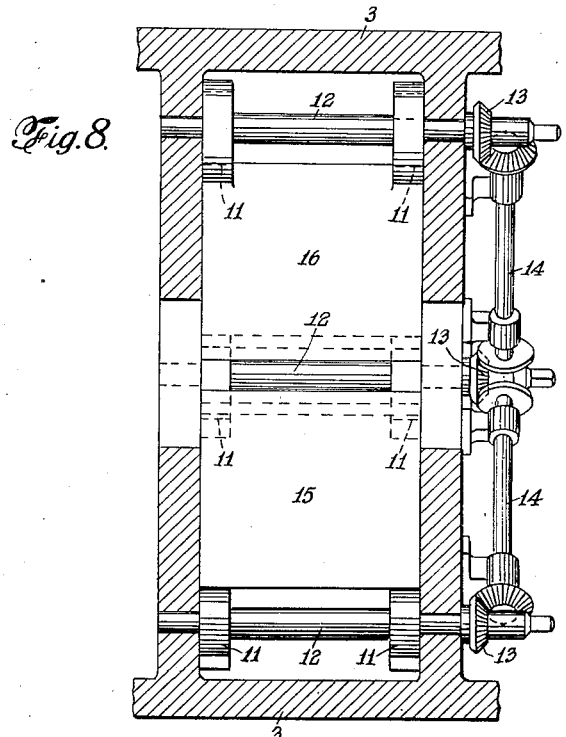

Patented July 6, 1937

2,086,492

UNITED STATES PATENT OFFICE 2,086,492

MACHINE FOR WORKING ON CURVED SHAFTS OR THE LIKE

Carl Gustaf Ekholm and Karl John William Janson, Lidkoping, Sweden, assignors to Lidköpings Mekaniska Verkstads Aktiebolag, Lidköping, Sweden, a corporation of Sweden Application October 25, 1935, Serial No. 46,682
In Sweden November 2, 1934

7 Claims. (Cl. 51—90)

Our invention relates to improvements in machines for working on parts of curved work pieces such as shafts or other objects of such a form that they cannot to advantage be machined on an ordinary lathe or surface grinder designed for rotating work-pieces. One object of the invention is to provide a machine specially adapted for working on airplane landing gear axles which, as is known, are made of thin-walled material and on account of their form are very difficult to work to the accuracy required.

Work-pieces of this kind have hitherto been machined by being rotatably set up in a large machine and turned and ground in the ordinary manner, or they have been stationarily fixed and worked by means of rotating tools, for instance, planetary rotating grinding wheels. The work has been clamped at a part not to be machined, and a support, for instance a center has generally been applied against a plug forced into the tube. This method, besides being time-wasting as it necessitates a very accurate centering, is very unsatisfactory, the tube being deformed when clamped, and, after having been removed, it resumes its original form causing an oval section of the part machined.

Another object of the invention is to utilize in a machine of this character the principle of centerless grinders in grinding stationary work pieces; another object being to revolve the work supports and the grinding member about the work piece and a further object being to revolve together a rotating grinding wheel and a rotating supporting wheel about a stationary work-piece; a refinement of this latter construction being to offset the axis of rotation of the grinding wheel from the plane passing through the axis of the portion of the work-piece being operated upon and the axis of the supporting wheel, whereby the tool does not diametrically engage the contacting line of the supporting roll.

Another object of the invention is to provide in a machine of this character a plurality of work supports mounted upon a member for revolving them about a common axis together with means for simultaneously adjusting the position of such supports toward and from such common axis for accommodating various diameters of work-pieces.

Another object of the invention is to provide in a machine of this character having a plurality of work supporting members, means for permitting at least one of such supports to yield away from the work-piece position; a further object being to provide two supporting members having faces disposed so as to form an angle having its apex turned against the tool.

Another object of the invention is to provide in a machine of this character, a revolving and rotating work tool and a revolving and rotating supporting roller, the axis of the supporting roller forming an angle to the axis of the tool in order to obtain an axial movement of the work piece during the operation upon it.

Another object of the invention is to provide a machine exceedingly well adapted for working on metal rods or wires of great lengths, where working with a rotary work piece and a stationary tool is difficult.

Another object of the invention is to provide a machine in which the work-piece passes through the machine in axial direction between the grinding wheel and the supports, it being wound and unwound on suitable reeling devices, located at the entrance and exit sides.

The invention is characterized substantially thereby that the machining is effected by means of a tool, for instance, a grinding wheel rotating around the part to be worked and that the latter is held in position by three or more supports, some of which being fixed in relation to the center line of the work-piece and others being yielding, and that all the supports bear against the surface to be worked and rotate synchronously relative to the same. The supports may either consist of guides or rotatably mounted rollers. It is preferable to use a stationary and a yielding guide and a freely rotating roller.

One embodiment of the invention is illustrated in the accompanying drawings, in which, Figures 1 and 2 show schematically how the work-piece, namely the above mentioned landing gear axle, the tool, in this case a grinding wheel, and the supports are applied in relation to each other.

Figure 3 is a front view of the machine.

Figure 4 is a section through the machine in a vertical plane through the center line of the work-piece and a part section through the feed mechanism for the grinding wheel.

Figures 5 and 6 show the machine arranged for grinding wires.

Figure 7 is a view, partly on a vertical plane, partly in elevation and partly in detail, showing the motion transmitting mechanism, and Figure 8 is a vertical section taken at about right angles to the plane of Figure 7.

In the bed 1 of the machine, see Figures 3 and 4, a number of rollers 2 are rotatably mounted and support a drum 3, enclosing tools and support devices for the work-piece 4. The drum can be rotated by the motor 5 through the pinions 6 and 7 and the worm gears 8 and 9. Holders 10 for the support devices are slidably mounted in the drum and adjustable by means of eccentrics or cams 11, fixed on shafts 12, which latter can be connected by means of bevel gear wheels 13 and shafts 14, in order to provide a mutual adjustment of the support devices toward and from the center of rotation of the drum. The work-piece is supported by a fixed support guide 15, a yielding support guide 16 and a freely rotating roller 17 which is divided in two parts to permit of applying a bearing in the middle for the sake of rigidity. The work-piece is consequently supported in all positions of the drum. One of the support guides 16 being yieldingly mounted, and play between the work-piece and the support device is avoided upon the diametrical reduction of the work-piece in the course of operation. The grinding wheel 18 is mounted on a frame 20 capable of turning about a shaft 19 and driven by a flange motor 21, directly coupled to the grinding spindle. At the front side of the frame a differential gear box 22 is provided, the mode of operation of which is described in the following. By means of this differential gear box the grinding wheel can be moved toward and from the work-piece by means of the hand wheel 23. The directions of rotation of the grinding wheel are indicated by the arrows in Figure 1.

The axis of rotation of the grinding wheel is located in such a manner that the line of contact between the grinding wheel and the work-piece is located outside a plane through the center lines of the work-piece and the supporting roller.

The device for adjusting the position of the grinding wheel works in the following manner.

An internal gear ring 24 is fixed to the drum 3 and during the rotation of the drum it drives through the gear 25 the hollow shaft 26, the gears 27 and 28 and the ring 29 which latter is provided with internal gears. This internal gear ring in its turn moves the internal gear ring 34, which is rotatably mounted in the drum 3, by the gears 30, 31, the shaft 32 and the gear 33 at the same speed as that of the drum 3 and the gear ring 24. Through turning the lever 37 by means of the hand wheel 23 and the worm gears 35, 36 and on which lever the intermediate wheel 38 is fixed, the gear ring 34 obtains a movement relative to the drum 3. This movement is transmitted through the gear wheel 38, the shaft 39 and the bevel gear box 40 to the screw 41, which acts upon the frame 20 of the grinding wheel.

The mode of operation of the machine is apparent from the drawings. When working on landing gear axles the part of the work piece to be machined is located between the support guides 15 and 16, having preferably oblique planes of support, in order to better secure the work-piece and to prevent it from falling down in the course of operation against the supporting roller 17 which is located about diametrically to the line of contact of the grinding wheel. The extending part rests on a support or is held by the hands, in order to prevent its taking part in the rotation. The rotary movements of the drum 3 having commenced, the grinding wheel is advanced by means of the hand wheel 23 against the work piece until the same has obtained the diameter desired.

When working on wire the work-piece 4 passes in an axial direction between the grinding wheel and the supports. Through the oblique position of the supporting roller 17 the work-piece obtains an axial displacement facilitated through the reeling device 42 on which the wire is wound after having passed through the machine, being driven by means of a special driving mechanism, in this case by a worm gear drive 43. With this kind of grinding it is preferable to give an oblique position to the support roller in order to obtain an axial advancement of the work-piece during operation.

The invention is not limited to the embodiment now described and shown but may be varied in its details without deviating from the principle of the invention.

We claim:

1. In a machine of the character described, the combination with a tool mounted for rotation around a non-rotating work piece and for working upon the surface of such work piece, of a number of work piece supports rotatable synchronically about the work piece, the said supports bearing against the surface being ground by the tool, at least one of such supports being elastically yieldable for permitting the work piece to be yieldingly carried.

2. In a machine of the character described, the combination with a tool mounted for rotation around a non-rotating work piece and for working upon the surface of such work piece, of two work piece supports rotatable synchronically about the work piece, the said supports bearing against the surface being ground by the tool, one of such supports being fixed and the other being elastically yieldable for permitting the work-piece to be yieldingly carried.

3. In a machine of the character described, the combination with a tool mounted for rotation around a non-rotating work piece and for working upon the surface of such work piece, of a number of work-piece supports rotatable synchronically about the work piece, the said supports bearing against the surface being ground by the tool, and motion transmitting members connecting the work-piece supports together in order to obtain simultaneous adjustment of the position of the supports for various diameters of the work-pieces.

4. In a machine of the character described, the combination with a tool mounted for rotation around a non-rotating work-piece and for working upon the surface of such work piece, of a number of work-piece supporting guides rotatable synchronically about the work-piece, the work engaging faces of the supporting guides, bearing against the surface being ground by the tool, forming an angle having its apex turned against the tool.

5. In a machine of the character described, the combination with a tool mounted for rotation around a non-rotating work-piece and for working upon the surface of such work-piece, of a number of work-piece supports rotatable synchronically about the work-piece, the said supports comprising a roller and a pair of supporting guides having work engaging faces for bearing against the surface being ground by the tool, forming an angle having its apex turned against the tool, the organization being such that the line of engagement of the tool on the work-piece is displaced relative to a plane through the center lines of the work-piece and the supporting roller so that the tool does not diametrically engage the contact line of the supporting roller.

6. In a machine of the character described, the combination with a tool mounted for rotation around a non-rotating work-piece and for working upon the surface of such work-piece, of a number of work-piece supports rotatable synchronically about the work-piece, the said supports embodying at least one supporting roller, the axis of which forms an angle to the axis of the tool in order to obtain an axial displacement of the work-piece during the operation.

7. In a machine of the character described, the combination with a tool mounted for rotation around a non-rotating work-piece and for working upon the surface of such work-piece, of a number of work-piece supports rotatable synchronically about the work-piece, the said supports comprising a roller and a pair of supporting guides having work engaging faces for bearing against the surface being ground by the tool, forming an angle having its apex turned against the tool, at least one of such supports being elastically yieldable for permitting the work-piece to be yieldingly carried.

CARL GUSTAF EKHOLM.
KARL JOHN WILLIAM JANSON.